United States Patent
Hyakudai et al.

(10) Patent No.: US 10,855,379 B2
(45) Date of Patent: Dec. 1, 2020

(54) COMMUNICATION DEVICE AND COMMUNICATION SYSTEM

(71) Applicant: Sony Corporation, Tokyo (JP)

(72) Inventors: Toshihisa Hyakudai, Kanagawa (JP); Masanari Yamamoto, Kanagawa (JP); Takeshi Ogura, Kanagawa (JP); Tsugita Komatsu, Tokyo (JP); Hiroshi Morita, Kanagawa (JP); Gen Ichimura, Tokyo (JP)

(73) Assignee: Sony Corporation, Tokyo (JP)

( * ) Notice: Subject to any disclaimer, the term of this patent is extended or adjusted under 35 U.S.C. 154(b) by 80 days.

(21) Appl. No.: 15/545,606

(22) PCT Filed: Apr. 12, 2016

(86) PCT No.: PCT/JP2016/001985
§ 371 (c)(1),
(2) Date: Jul. 21, 2017

(87) PCT Pub. No.: WO2016/170754
PCT Pub. Date: Oct. 27, 2016

(65) Prior Publication Data
US 2018/0041286 A1    Feb. 8, 2018

(30) Foreign Application Priority Data

Apr. 22, 2015 (JP) .................. 2015-087354

(51) Int. Cl.
*H04B 10/564* (2013.01)
*H04B 10/079* (2013.01)
(Continued)

(52) U.S. Cl.
CPC ..... *H04B 10/564* (2013.01); *H04B 10/07955* (2013.01); *H04B 10/25* (2013.01); *H04B 2210/08* (2013.01); *H04J 14/02* (2013.01)

(58) Field of Classification Search
CPC ............... H04B 10/504; H04B 10/564; H04B 10/07955; H04B 10/12; H04B 10/25; H04B 2210/08; H04J 14/02
See application file for complete search history.

(56) References Cited

U.S. PATENT DOCUMENTS 5,696,859 A * 12/1997 Onaka ................ G02B 6/12007
372/20
5,808,760 A * 9/1998 Gfeller ............... H04B 10/1143
340/13.24
(Continued)

FOREIGN PATENT DOCUMENTS

JP      H03232328 A    10/1991
JP      H04-155874 A    5/1992
(Continued)

OTHER PUBLICATIONS

Japanese Office Action dated Dec. 18, 2018 for corresponding Japanese Application No. 2015-087354.

*Primary Examiner* — Mina M Shalaby
(74) *Attorney, Agent, or Firm* — Michael Best & Friedrich LLP

(57) ABSTRACT

A communication device includes a transmitter configured to generate a data signal, and a controller configured to stop an operation of the transmitter in response to an optical transmission stop instruction. The optical transmission stop instruction preferably has a predetermined bit pattern.

22 Claims, 7 Drawing Sheets

(51) Int. Cl.
*H04B 10/25* (2013.01)
*H04J 14/02* (2006.01)

(56) References Cited

U.S. PATENT DOCUMENTS

| | | | | |
|---|---|---|---|---|
| 6,269,096 | B1* | 7/2001 | Hann | H04Q 11/0478 |
| | | | | 370/366 |
| 7,006,769 | B1* | 2/2006 | Kawasaki | G02F 1/0121 |
| | | | | 398/147 |
| 7,113,699 | B1* | 9/2006 | Bhate | H04B 10/07953 |
| | | | | 370/222 |
| 10,135,645 | B1* | 11/2018 | Mazzini | H04L 25/03057 |
| 2004/0209635 | A1* | 10/2004 | Hsu | H04W 52/20 |
| | | | | 455/522 |
| 2005/0105900 | A1* | 5/2005 | Akimoto | H04B 10/03 |
| | | | | 398/16 |
| 2005/0105913 | A1* | 5/2005 | Ozeki | H04B 10/077 |
| | | | | 398/140 |
| 2005/0259996 | A1* | 11/2005 | Leger | H04B 10/504 |
| | | | | 398/182 |
| 2006/0067690 | A1 | 3/2006 | Tatum et al. | |
| 2009/0214198 | A1* | 8/2009 | Takahashi | H01S 5/06825 |
| | | | | 398/1 |
| 2009/0279897 | A1* | 11/2009 | Takeuchi | H04B 10/077 |
| | | | | 398/137 |
| 2014/0126897 | A1* | 5/2014 | Nakata | H04B 10/0771 |
| | | | | 398/2 |
| 2015/0188638 | A1* | 7/2015 | Tanaka | H04B 10/0799 |
| | | | | 398/140 |
| 2016/0134405 | A1* | 5/2016 | Luo | H04L 5/0055 |
| | | | | 370/328 |
| 2017/0019174 | A1* | 1/2017 | Shiraishi | H04B 10/07955 |
| 2018/0006716 | A1* | 1/2018 | Hyakudai | H04B 10/07 |
| 2018/0076899 | A1* | 3/2018 | Hyakudai | H04B 10/50 |

FOREIGN PATENT DOCUMENTS

| | | |
|---|---|---|
| JP | 2004-350155 A | 12/2004 |
| JP | 2008-193327 A | 8/2008 |
| JP | 2009-296292 A | 12/2009 |
| JP | 2010-004356 A | 1/2010 |
| JP | 2010-093748 A | 4/2010 |
| JP | 2010-219878 A | 9/2010 |
| JP | 2010-246147 A | 10/2010 |

* cited by examiner

[FIG. 1]
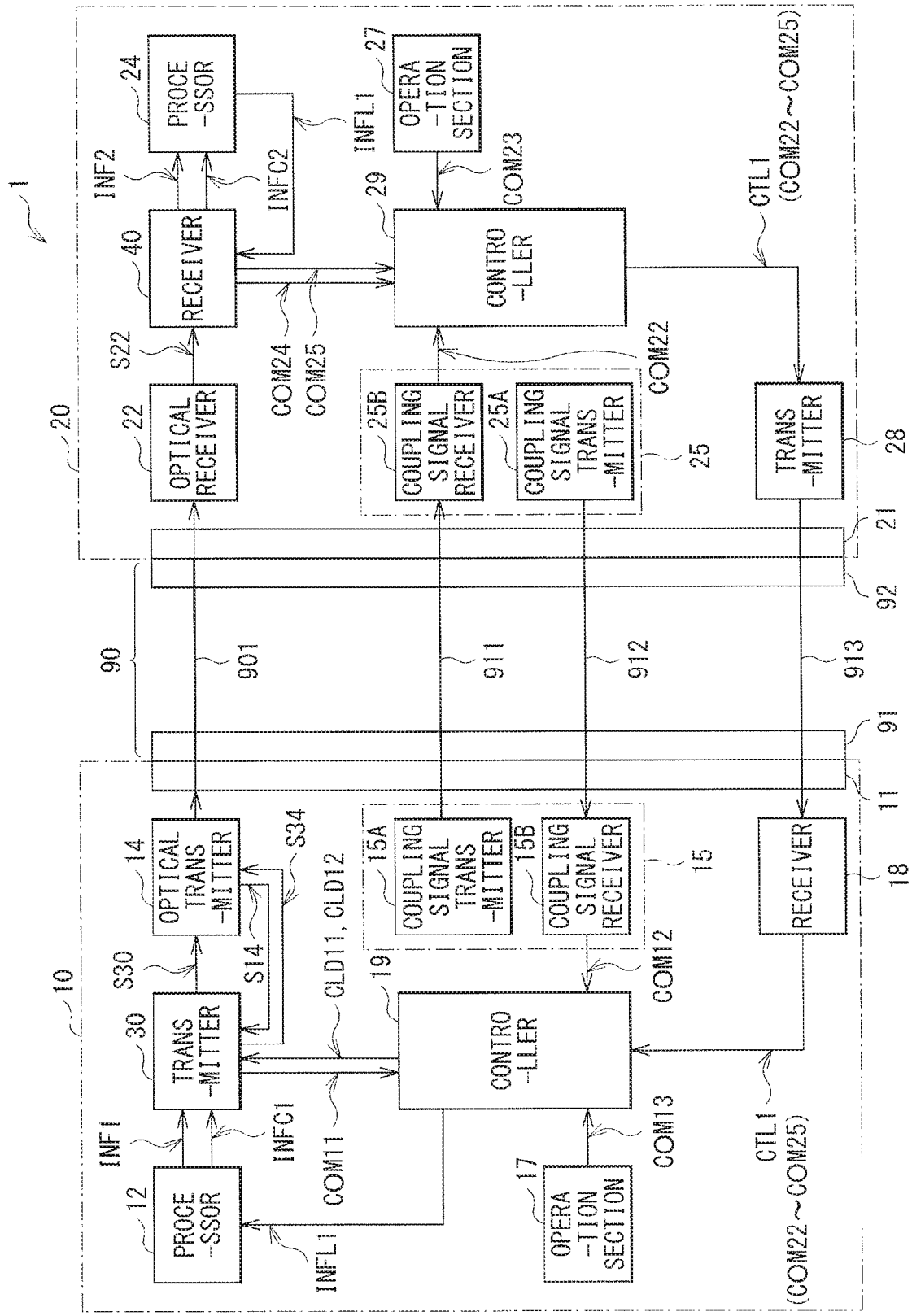

[FIG. 2]
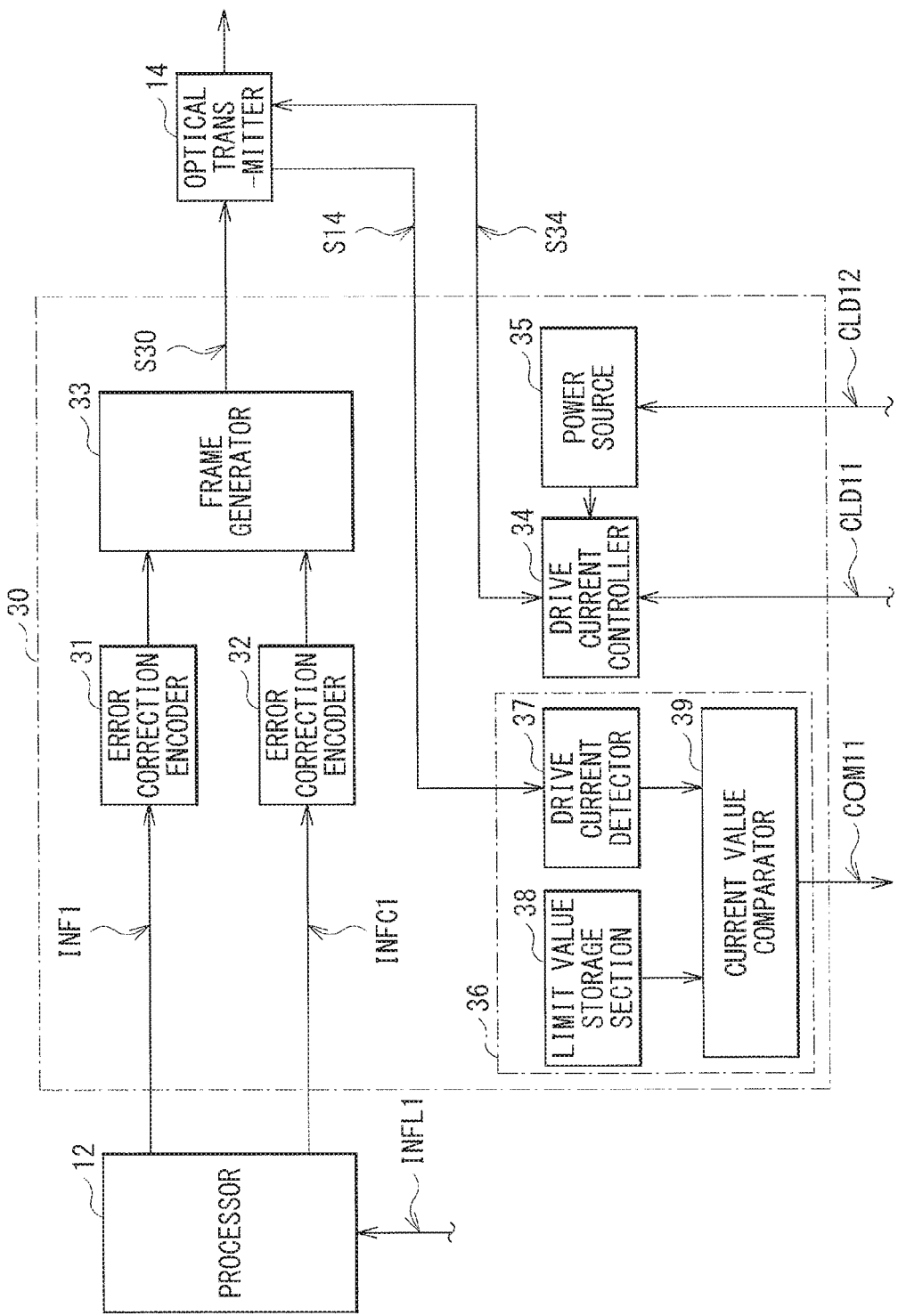

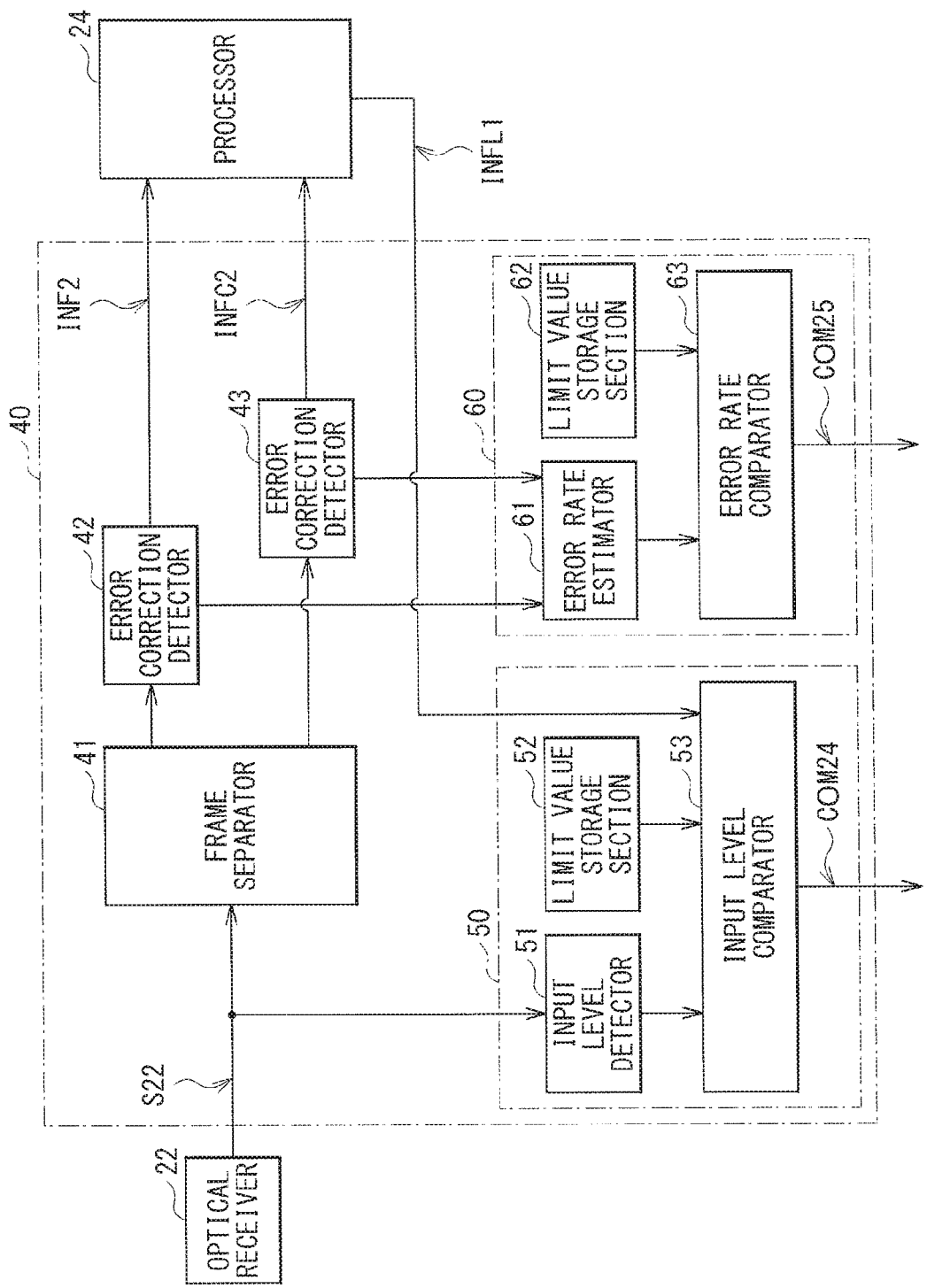

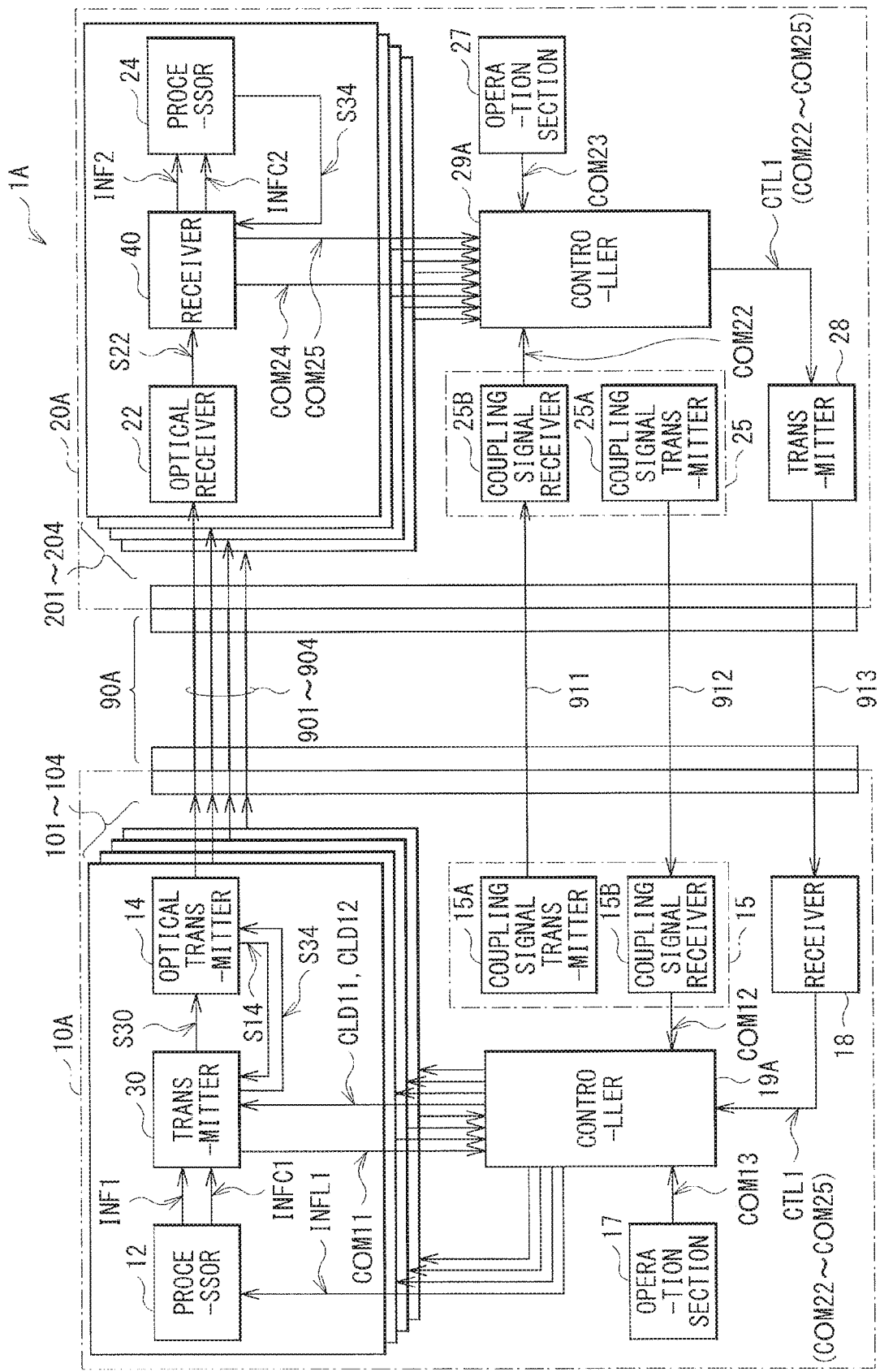
[FIG. 4]

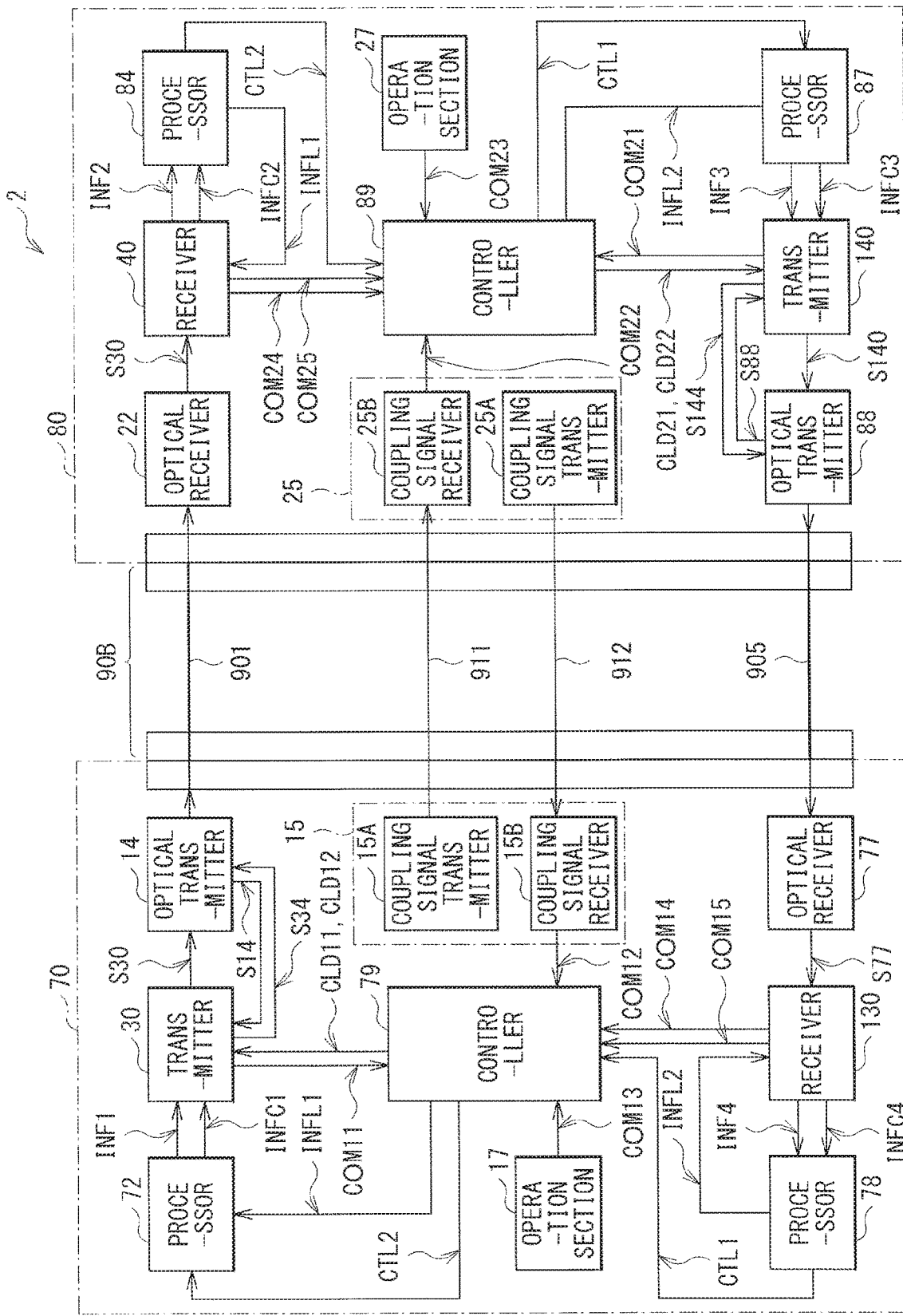
[FIG. 5]

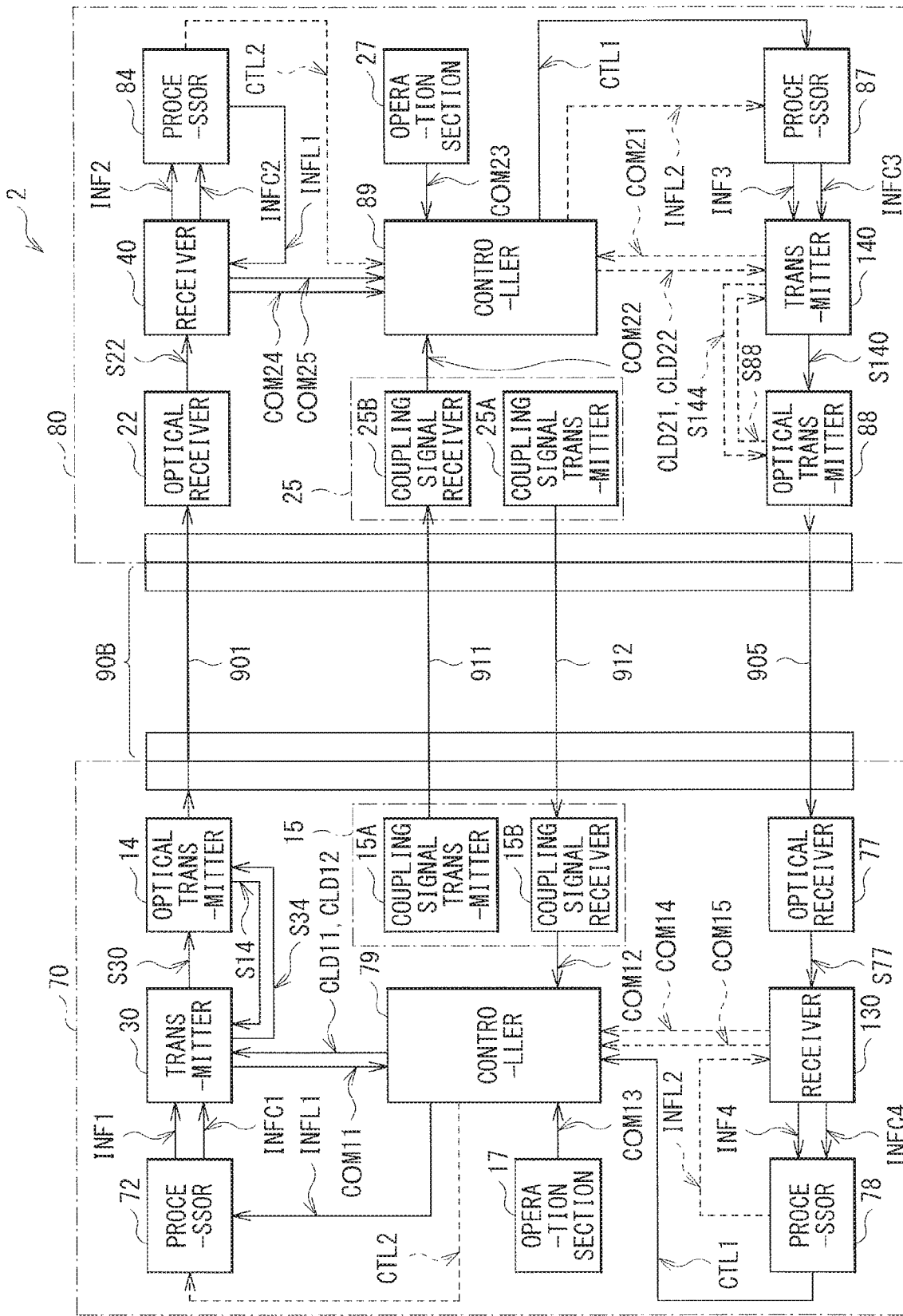
[FIG. 6A]

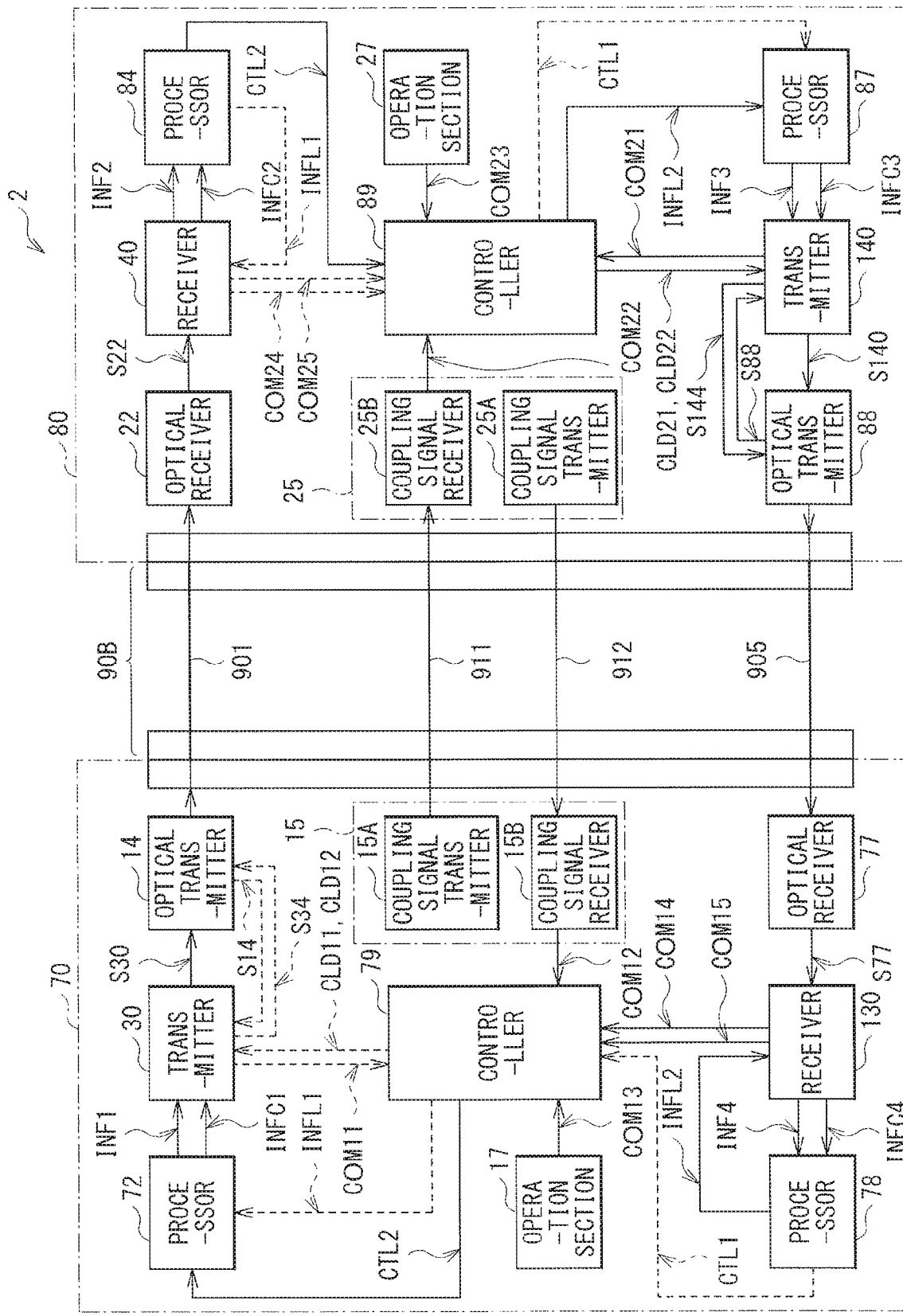
[FIG. 6B]

COMMUNICATION DEVICE AND COMMUNICATION SYSTEM

CROSS REFERENCE TO RELATED APPLICATIONS

This application claims the benefit of Japanese Priority Patent Application JP 2015-087354 filed Apr. 22, 2015, the entire contents of which are incorporated herein by reference.

TECHNICAL FIELD

The disclosure relates to a communication device configured to exchange data, and a communication system including such a communication device.

BACKGROUND ART

In association with high functionality and multi-functionality of an electronic apparatus in recent years, an amount of information to be exchanged between electronic apparatuses is increased. For example, the electronic apparatus is often coupled to other electronic apparatuses through wired communication. In the case of exchanging a lot of pieces of data, an optical fiber is often used in the wired communication.

Optical communication systems using optical fibers often take measures to reduce influence of an optical signal on a human body, for example, in a case where the optical fiber comes off. For example, in PTL 1, there is disclosed an optical output control system in which a drive signal is supplied to an optical transmitter, based on whether a terminal attached to an optical fiber is coupled to an optical connector. Moreover, for example, in PTLs 2 and 3, there are disclosed communication systems in which in a case where a reception device detects a reception error, the reception device transmits, to a transmission device, an instruction to stop optical transmission by an optical transmitter.

CITATION LIST

Patent Literature

[PTL 1]
Japanese Unexamined Patent Application Publication No. H04-155874
[PTL 2]
Japanese Unexamined Patent Application Publication No. 2008-193327
[PTL 3]
Japanese Unexamined Patent Application Publication No. H03-232328

SUMMARY

Technical Problem

Thus, in the communication systems, high safety is desired, and further enhancement of safety is expected.

It is desirable to provide a communication device and a communication system that make it possible to enhance safety.

Solution to Problem

According to one aspect of the present disclosure, there is provided a communication device including a transmitter configured to generate a data signal; and a controller configured to stop an operation of the transmitter in response to an optical transmission stop instruction.

According to another aspect of the present disclosure, there is provided a communication device, including a receiver configured to receive a data signal; a controller configured to generate an optical transmission stop instruction; and a transmitter configured to receive the optical transmission stop instruction from the controller and transmit the optical transmission stop instruction to an external device via an electrical wire.

According to another aspect of the present disclosure, there is provided a communication system, including a first communication device, having a first transmitter configured to generate a first data signal, and a first controller configured to stop an operation of the first transmitter in response to an optical transmission stop instruction; a second communication device, having a first receiver configured to receive a second data signal; and a transmission cable having an electrical wire and at least one optical fiber.

According to another aspect of the present disclosure, there is provided a communication method, including generating, at a first communication device, a first data signal; generating, at a second communication device optically coupled to the first communication device, a second data signal based on the first data signal; and in response to an optical transmission stop instruction, stopping the generating of the first data signal.

Advantageous Effects of Invention

According to the communication devices, the communication system, and the communication method of the respective embodiments of the disclosure, coupling to the communication partner is detected with use of the first electrical signal, and the optical transmission operation in the optical transmitter is stopped, based on the thus-obtained detection result, which makes it possible to enhance safety.

According to the communication devices, the communication system, and the communication method of the embodiment of the disclosure, coupling to the communication partner is detected with use of the first electrical signal, and the optical transmission stop instruction is generated, based on the thus-obtained detection result, which makes it possible to enhance safety.

Note that effects described here are non-limiting. Effects achieved by the technology may be one or more of effects described in the disclosure. It is to be understood that both the foregoing general description and the following detailed description are exemplary, and are provided to provide further explanation of the technology as claimed.

BRIEF DESCRIPTION OF DRAWINGS

The accompanying drawings are included to provide a further understanding of the technology, and are incorporated in and constitute a part of this specification. The drawings illustrate embodiments and, together with the specification, serve to explain the principles of the technology.

FIG. 1 is a block diagram of a configuration example of a communication system according to an embodiment of the disclosure.

FIG. 2 is a block diagram of a configuration example of a transmitter illustrated in FIG. 1.

FIG. 3 is a block diagram of a configuration example of a receiver illustrated in FIG. 1.

FIG. 4 is a block diagram of a configuration example of a communication system according to a modification example.

FIG. 5 is a block diagram of a configuration example of a communication system according to another modification example.

FIG. 6A is an explanatory diagram of an operation example of the communication system illustrated in FIG. 5.

FIG. 6B is another explanatory diagram of an operation example of the communication system illustrated in FIG. 5.

DESCRIPTION OF EMBODIMENTS

Some embodiments of the disclosure are described in detail below with reference to drawings.

Configuration Example

FIG. 1 illustrates a configuration example of a communication system (a communication system 1) according to an embodiment. The communication system 1 performs communication using optical signals. The communication system 1 may include a transmission cable 90, a transmission device 10, and a reception device 20. The transmission device 10 and the reception device 20 are coupled to each other through the transmission cable 90.

The transmission cable 90 may include an optical fiber 901, electric wires 911 to 913, and connectors 91 and 92. The optical fiber 901 is adapted to transmit a data signal from the transmission device 10 to the reception device 20. The electric wires 911 and 912 are adapted to transmit a coupling signal for detection of coupling between the transmission device 10 and the reception device 20 from the transmission device 10 and the reception device 20. More specifically, the electric wire 911 is adapted to transmit a coupling signal from the transmission device 10 to the reception device 20, and the electric wire 912 is adapted to transmit a coupling signal from the reception device 20 to the transmission device 10. The electric wire 913 is adapted to transmit a control signal CTL1 (to be described later) from the reception device 20 to the transmission device 10. The connector 91 is provided at a first end of the transmission cable 90, and is so configured as to be coupled to the connector 11 of the transmission device 10. The connector 92 is provided at a second end of the transmission cable 90, and is so configured as to be coupled to a connector 21 of the reception device 20.

(Transmission Device 10)

The transmission device 10 is adapted to transmit a data signal to the reception device 20 through the optical fiber 901. The transmission device 10 may include a connector 11, a processor 12, a transmitter 30, an optical transmitter 14, a coupling detector 15, an operation section 17, a receiver 18, and a controller 19.

The connector 11 is adapted to be coupled to the connector 91 of the transmission cable 90.

The processor 12 is adapted to perform predetermined processing to generate data INF1 and control data INFC1 and supply the data INF1 and the control data INFC1 to the transmitter 30. At this occasion, the processor 12 generates the control data INFC1, based on output level information INFL1. The output level information INFL1 is information indicating an output level Lout of an optical signal outputted from the optical transmitter 14.

The transmitter 30 is adapted to generate a data signal S30, based on the data INF1 and the control data INFC1. The transmitter 30 is also adapted to control optical transmission operation in the optical transmitter 14 with use of a signal S34, based on control signals CLD11 and CLD12. The transmitter 30 also has a function of generating an optical transmission stop instruction COM11, based on a drive current in the optical transmitter 14.

FIG. 2 illustrates a configuration example of the transmitter 30. In this figure, the processor 12 and the optical transmitter 14 are illustrated together with the transmitter 30. The transmitter 30 may include error correction encoders 31 and 32, a frame generator 33, a drive current controller 34, a power source 35, and a drive current monitor 36.

The error correction encoder 31 is adapted to perform error correction encoding, based on the data INF1 to generate an error correction code of the data INF1. Further, the error correction encoder 31 supplies the generated error correction code together with the data INF1 to the frame generator 33. Likewise, the error correction encoder 32 is adapted to perform error correction encoding, based on control data INFC1 to generate an error correction code of the control data INFC1. Further, the error correction encoder 32 supplies the generated error correction code together with the control data INFC1 to the frame generator 33.

The frame generator 33 is adapted to generate a frame, based on the data INF1 and the error correction code of the data INF1 that are supplied from the error correction encoder 31, and the control data INFC1 and the error correction code of the control data INFC1 that are supplied from the error correction encoder 32. Further, the frame generator 33 supplies the frame to the optical transmitter 14 with use of the data signal S30.

The drive current controller 34 is adapted to control a drive current in the optical transmitter 14, based on the control signal CLD11 to control the output level Lout of the optical signal outputted from the optical transmitter 14. At this occasion, the drive current controller 34 causes the drive current not to be fed to the optical transmitter 14 in a case where the control signal CLD11 is an instruction to stop the optical transmission operation in the optical transmitter 14. The power source 35 is adapted to supply power to the drive current controller 34. At this occasion, the power source 35 is allowed to stop supply of power to the drive current controller 34, based on the control signal CLD12.

The drive current monitor 36 may include a drive current detector 37, a limit value storage section 38, and a current value comparator 39. The drive current detector 37 is adapted to detect a current value Idrv of the drive current in the optical transmitter 14, based on a signal S14. The limit value storage section 38 is adapted to store an upper limit value IdrvH of the drive current in the optical transmitter 14. The current value comparator 39 is adapted to compare the current value Idrv of the drive current detected by the drive current detector 37 with the upper limit value IdrvH of the drive current stored in the limit value storage section 38 and, in a case where the current value Idrv is higher than the upper limit value IdrvH, generate the optical transmission stop instruction COM11.

The optical transmitter 14 is adapted to convert an electrical signal (the data signal S30) into an optical signal and output the optical signal. The optical transmitter 14 may include, for example, a laser diode. The optical transmitter 14 is also adapted to vary the drive current, based on the signal S34 to vary the output level Lout of the optical signal. The optical transmitter 14 also has a function of supplying, to the transmitter 30, the signal S14 for detection of the current value Idrv of the drive current.

The coupling detector 15 (see FIG. 1) is adapted to detect whether the transmission device 10 and the reception device 20 are coupled to each other. The coupling detector 15 may include a coupling signal transmitter 15A and a coupling signal receiver 15B. The coupling signal transmitter 15A is adapted to transmit a coupling signal to the reception device 20 through the electric wire 911. The coupling signal receiver 15B is adapted to receive a coupling signal transmitted from a coupling signal transmitter 25A (to be described later) of the reception device 20 through the electric wire 912 to detect whether the transmission device 10 and the reception device 20 are coupled to each other. Further, the coupling signal receiver 15B informs the controller 19 of a thus-obtained coupling detection result. At this occasion, when the coupling signal receiver 15B detects that the transmission device 10 and the reception device 20 are not coupled to each other, the coupling signal receiver 15B generates the optical transmission stop instruction COM12.

The operation section 17 is adapted to accept operation by a user. More specifically, the operation section 17 generates an optical transmission stop instruction COM13, based on the operation by the user.

The receiver 18 is adapted to receive, through the electric wire 913, the control signal CTL1 transmitted from the reception device 20. The control signal CTL1 may include, for example but not limited to, notification that the reception device 20 has received the data signal transmitted from the transmission device 10 and optical transmission stop instructions COM22 to COM25 (to be described later). Further, the receiver 18 supplies the control signal CTL1 to the controller 19.

The controller 19 is adapted to control operation of each block in the transmission device 10. More specifically, when the controller 19 receives, from the coupling signal receiver 15B, notification that the transmission device 10 and the reception device 20 are coupled to each other, the controller 19 supplies the control signal CLD11 and CLD12 to the transmitter 30 to control the optical transmitter 14 so as to feed a desired drive current through the optical transmitter 14. Further, the controller 19 generates output level information INFL1 indicating the output level Lout corresponding to the drive current, and supplies the output level information INFL1 to the processor 12. Moreover, when the controller 19 receives the optical transmission stop instructions COM11 to COM13 and COM22 to COM25 (to be described later), the controller 19 supplies the control signals CLD11 and CLD12 to the transmitter 30 to instruct the transmitter 30 to stop the optical transmission operation in the optical transmitter 14.

(Reception Device 20)

The reception device 20 is adapted to receive a data signal transmitted from the transmission device 10 through the optical fiber 901. The reception device 20 may include the connector 21, an optical receiver 22, a receiver 40, a processor 24, a coupling detector 25, an operation section 27, a transmitter 28, and a controller 29.

The connector 21 is adapted to be coupled to the connector 92 of the transmission cable 90.

The optical receiver 22 is adapted to convert the optical signal transmitted from the transmission device 10 into an electrical signal to generate a data signal S22. The optical receiver 22 may include, for example, a photodiode.

The receiver 40 is adapted to generate data INF2 and control data INFC2, based on the data signal S22. The receiver 40 also has a function of generating the optical transmission stop instruction COM24, based on an input level Lin of the data signal S22 and generating the optical transmission stop instruction COM25, based on an error rate BER of the data signal S22.

FIG. 3 illustrates a configuration example of the receiver 40. In this figure, the optical receiver 22 and the processor 24 are illustrated together with the receiver 40. The receiver 40 may include a frame separator 41, error correction decoders 42 and 43, an input level monitor 50, and an error rate monitor 60.

The input level monitor 50 is adapted to generate the optical transmission stop instruction COM24, based on the input level Lin of the data signal S22. The input level monitor 50 may include an input level detector 51, a limit value storage section 52, and an input level comparator 53. The input level detector 51 is adapted to detect the input level Lin of the optical signal received by the optical receiver 22, based on the data signal S22. The limit value storage section 52 is adapted to store an upper limit value LinH and a lower limit value LinL of the input level Lin. The input level comparator 53 is adapted to compare the input level Lin detected by the input level detector 51 with the upper limit value LinH and the lower limit value LinL of the input level Lin stored in the limit value storage section 52 and, in a case where the input level Lin is higher than the upper limit value LinH or in a case where the input level Lin is lower than the lower limit value LinL, generate the optical transmission stop instruction COM24. Moreover, the input level comparator 53 is adapted to estimate a range of the input level Lin, based on the output level Lout of the optical signal outputted from the optical transmitter 14, that is indicated by the output level information INFL1 supplied from the processor 24, in consideration of, for example but not limited to, loss of optical transmission lines (such as the optical fiber 901 and the connectors 91, 92, 11, and 21) and minimum optical sensitivity of the optical receiver 22. Further, even in a case where the input level Lin detected by the input level detector 51 is out of the thus-estimated range of the input level Lin, the input level comparator 53 generates the optical transmission stop instruction COM24.

The frame separator 41 is adapted to extract, based on the data signal S22, data and an error correction code of the data from a frame included in the data signal S22 and supply the data and the error correction code of the data to the error correction decoder 42, and to extract, based on the data signal S22, control data and an error correction code of the control data from the frame and supply the control data and the error correction code of the control data to the error correction decoder 43.

The error correction decoder 42 is adapted to perform error correction decoding, based on the data and the error correction code of the data that are supplied from the frame separator 41 to generate data INF2. The error correction decoder 42 also has a function of counting the number of errors in a predetermined period and supplying a thus-obtained counting result to the error rate monitor 60. Likewise, the error correction decoder 43 is adapted to perform error correction decoding, based on the control data and the error correction code of the control data that are supplied from the frame separator 41 to generate control data INFC2. The error correction decoder 43 also has a function of counting the number of errors in a predetermined period and supplying a thus-obtained counting result to the error rate monitor 60.

The error rate monitor 60 is adapted to generate the optical transmission stop instruction COM25, based on the counting results supplied from the error correction decoders 42 and 43. The error rate monitor 60 may include an error rate estimator 61, a limit value storage section 62, and an error rate comparator 63. The error rate estimator 61 is adapted to estimate the error rate BER in the communication system 1, based on the counting results supplied from the error correction decoders 42 and 43. The limit value storage section 62 is adapted to store an upper limit value BERH of the error rate BER. The error rate comparator 63 is adapted to compare the error rate BER estimated by the error rate estimator 61 with the upper limit value BERH of the error rate BER stored in the limit value storage section 52 and, in a case where the error rate BER is higher than the upper limit value BERH, generate the optical transmission stop instruction COM25.

The processor 24 (see FIG. 1) is adapted to perform predetermined processing, based on the data INF2 and the control data INFC2. The processor 24 also has a function of supplying the output level information INFL1 included in the control data INFC2 to the input level monitor 50 of the receiver 40.

The coupling detector 25 is adapted to detect whether the transmission device 10 and the reception device 20 are coupled to each other. The coupling detector 25 may include a coupling signal transmitter 25A and a coupling signal receiver 25B. The coupling signal transmitter 25A is adapted to transmit the coupling signal to the transmission device 10 through the electric wire 912. The coupling signal receiver 25B is adapted to receive the coupling signal transmitted from the coupling signal transmitter 15A of the transmission device 10 through the electric wire 911 to detect coupling between the transmission device 10 and the reception device 20. Further, the coupling signal receiver 25B informs the controller 29 of a thus-obtained coupling detection result. At this occasion, when the coupling signal receiver 25B detects that the transmission device 10 and the reception device 20 are not coupled to each other, the coupling signal receiver 25B generates the optical transmission stop instruction COM22.

The operation section 27 is adapted to accept operation by a user. More specifically, the operation section 27 generates the optical transmission stop instruction COM23, based on the operation by the user.

The transmitter 28 is adapted to transmit the control signal CTL1 supplied from the controller 29 to the transmission device 10 through the electric wire 913.

The controller 29 is adapted to control operation of each block in the reception device 20. More specifically, when the controller 29 receives, from the coupling signal receiver 25B, notification that the transmission device 10 and the reception device 20 are coupled to each other, the controller 29 allows the receiver 40 to start reception of the data signal. Further, the controller 29 generates the control signal CTL1 including notification that the receiver 40 has received the data signal transmitted from the transmission device 10. Moreover, when the controller 29 receives the optical transmission stop instructions COM22 to COM25, the controller 29 generates the control signal CTL1 including the optical transmission stop instructions COM22 to COM25.

Here, the transmitter 30 corresponds to a specific but non-limiting example of "transmitter" of a first communication device in an embodiment of the disclosure. The coupling detector 15 corresponds to a specific but non-limiting example of "coupling detector" of a first communication device in an embodiment of the disclosure. The controller 19 corresponds to a specific but non-limiting example of "controller" of a first communication device in an embodiment of the disclosure. The receiver 18 corresponds to a specific but non-limiting example of "receiver" of a first communication device in an embodiment of the disclosure.

The receiver 40 corresponds to a specific but non-limiting example of "receiver" of a second communication device in an embodiment of the disclosure. The coupling detector 25 corresponds to a specific but non-limiting example of "coupling detector" of a second communication device in an embodiment of the disclosure. The controller 29 corresponds to a specific but non-limiting example of "controller" of a second communication device in an embodiment of the disclosure. The transmitter 28 corresponds to a specific but non-limiting example of "transmitter" of a second communication device in an embodiment of the disclosure.

Data transferred by the transmitter may be arranged in a common data structure for each channel of communication, called a "lane frame." For example, the lane frame may consist of a large number of data units, where the first data unit is a header unit and is followed by a series of payload units. The size of each unit is uniform; for example, eighteen bytes.

The optical transmission stop instructions are preferably data units having a predetermined and uniform structure, and form the header unit for a particular lane frame when present. The structure includes two bytes of head, fifteen bytes of packet body, and one byte of tail. Each of the fifteen bytes of the packet body are identical to one another; that is, they have identical bit patterns. Accordingly, the optical transmission stop instructions may have the following order: a first bit pattern, followed by a second bit pattern, followed by a third bit pattern repeating fifteen times, followed by a fourth bit pattern. Various ones of the first, second, third, and fourth bit patterns may be the same as one another; for example, the second bit pattern may be identical to the third bit pattern.

[Operation and Workings]

Next, operation and workings of the communication system 1 according to the embodiment are described below.

(General Operation Outline)

First, general operation outline of the communication system 1 is described with reference to FIG. 1. In the transmission device 10, the processor 12 (see FIG. 1) performs predetermined processing to generate the data INF1 and the control data INFC1 including the output level information INFL1. The transmitter 30 generates the data signal S30, based on the data INF1 and the control data INFC1. The transmitter 30 also controls the optical transmission operation in the optical transmitter 14, based on the control signals CLD11 and CLD12 with use of the signal S34. The optical transmitter 14 converts the electrical signal (the data signal S30) into an optical signal to output the optical signal. The coupling detector 15 detects coupling between the transmission device 10 and the reception device 20. The receiver 18 receives, through the electric wire 913, the control signal CTL1 transmitted from the reception device 20. The controller 19 generates the output level information INFL1, and controls the drive current controller 34 and the power source 35 of the transmitter 30 with use of the control signals CLD11 and CLD12.

In the reception device 20, the optical receiver 22 converts the optical signal transmitted from the transmission device 10 into an electrical signal to generate the data signal S22. The receiver 40 generates the data INF2 and the control data INFC2, based on the data signal S22. The processor 24 performs predetermined processing, based on the data INF2 and the control data INFC2, and supplies the output level information INFL1 included in the control data INFC2 to the receiver 40. The coupling detector 25 detects coupling between the transmission device 10 and the reception device 20. The controller 29 generates the control signal CTL1 including notification that the reception device 20 has received the data signal transmitted from the transmission device 10. The transmitter 28 transmits the control signal CTL1 to the transmission device 10 through the electric wire 913.

In a case where communication is not properly performed in the communication system 1, various blocks generate optical transmission stop instructions. More specifically, in the reception device 20, the input level monitor 50 of the receiver 40 generates the optical transmission stop instruction COM24, based on the input level Lin of the data signal S22. The error rate monitor 60 of the receiver 40 generates the optical transmission stop instruction COM25, based on the error rate BER of the data signal S22. When the coupling detector 25 detects that the transmission device 10 and the reception device 20 are not coupled to each other, the coupling detector 25 generates the optical transmission stop instruction COM22. The operation section 27 generates the optical transmission stop instruction COM23, based on operation by a user. The controller 29 generates the control signal CTL1 including the optical transmission stop instructions COM22 to COM25, based on the received optical transmission stop instructions COM22 to COM25. Thereafter, the transmitter 28 transmits the control signal CTL1 including the optical transmission stop instructions COM22 to COM25 to the transmission device 10.

In the transmission device 10, the drive current monitor 36 of the transmitter 30 generates the optical transmission stop instruction COM11, based on the drive current in the optical transmitter 14. When the coupling detector 15 detects that the transmission device 10 and the reception device 20 are not coupled to each other, the coupling detector 15 generates the optical transmission stop instruction COM12. The operation section 17 generates the optical transmission stop instruction OCM13, based on operation by a user. The receiver 18 receives the control signal CTL1 including the optical transmission stop instructions COM22 to COM25. The control signal CTL1 is transmitted from the reception device 20. When the controller 19 receives the optical transmission stop instructions COM11 to COM13 and COM22 to COM25, the controller 19 supplies the control signal CLD11 and CLD12 to the transmitter 30 to instruct the transmitter 30 to stop optical transmission operation in the optical transmitter 14.

(Detailed Operation)

Even if unintended various situations occur, the communication system 1 enables to reduce a possibility that laser light is leaked from an optical cable. Detailed description is given of operation of the communication system 1 in the following three cases C1 to C3.

(Case C1)

The case C1 is that the transmission cable 90 comes off from the transmission device 10 or the reception device 20 due to an unintended reason.

In the case C1, the coupling signal receiver 15B of the transmission device 10 becomes unable to receive the coupling signal transmitted from the coupling signal transmitter 25A of the reception device 20. Likewise, the coupling signal receiver 25B of the reception device 20 becomes unable to receive the coupling signal transmitted from the coupling signal transmitter 15A of the transmission device 10. At this occasion, the coupling signal receiver 15B of the transmission device 10 detects that the transmission device 10 and the reception device 20 are not coupled to each other, and generates the optical transmission stop instruction COM12. The controller 19 instructs the transmitter 30, based on the optical transmission stop instruction COM12, to stop optical transmission operation in the optical transmitter 14. More specifically, the controller 19 instructs the drive current controller 34 with use of the control signal CLD11 to stop the optical transmission operation in the optical transmitter 14. Thus, the drive current controller 34 controls the drive current not to be fed to the optical transmitter 14. Consequently, the optical transmitter 14 stops the optical transmission operation.

Moreover, in the case C1, since the receiver 18 is unable to receive the control signal CTL1, the controller 19 does not receive notification that the reception device 20 has received the data signal transmitted from the transmission device 10. Accordingly, the controller 19 instructs the drive current controller 34 with use of the control signal CLD11 to stop the optical transmission operation in the optical transmitter 14. Consequently, the optical transmitter 14 stops the optical transmission operation.

Further, for example, in a case where a user notices that the transmission cable 90 comes off, the user operates the operation section 17 of the transmission device 10, and the operation section 17 thereby generates the optical transmission stop instruction COM13. The controller 19 instructs the transmitter 30, based on the optical transmission stop instruction COM13, to stop the optical transmission operation in the optical transmitter 14. More specifically, the controller 19 instructs the drive current controller 34 with use of the control signal CLD11 to stop the optical transmission operation in the optical transmitter 14. Consequently, the optical transmitter 13 stops the optical transmission operation.

Furthermore, the user may operate the operation section 27 of the reception device 20, and the operation section 27 may thereby generate the optical transmission stop instruction COM23. In this case, the controller 29 generates the control signal CTL1 including the optical transmission stop instruction COM23, based on the received optical transmission stop instruction COM23, and the transmitter 28 transmits the control signal CTL1 including the optical transmission stop instruction COM23 to the transmission device 10. In the transmission device 10, the receiver 18 receives the control signal CTL1 including the optical transmission stop instruction COM23. Thereafter, the controller 19 instructs the transmitter 30, based on the optical transmission stop instruction COM23, to stop the optical transmission operation in the optical transmitter 14. More specifically, the controller 19 instructs the drive current controller 34 with use of the control signal CLD11 to stop the optical transmission operation in the optical transmitter 14. Consequently, the optical transmitter 14 stops the optical transmission operation.

(Case C2)

The case C2 is that the optical fiber 901 of the transmission cable 90 is broken, and the electric wires 911 to 913 are not broken.

In the case C2, the coupling signal receiver 15B of the transmission device 10 receives the coupling signal transmitted from the coupling signal transmitter 25A of the reception device 20. Likewise, the coupling signal receiver 25B of the reception device 20 receives the coupling signal transmitted from the coupling signal transmitter 15A of the transmission device 10. Accordingly, the optical transmission stop instructions COM12 and COM22 are not generated.

Since the optical fiber 901 is broken, the input level Lin is decreased in the reception device 20. Accordingly, in the input level monitor 50 of the receiver 40, the input level comparator 53 determines that the input level Lin detected by the input level detector 51 is lower than the lower limit value LinL of the input level Lin stored in the limit value storage section 52, and generates the optical transmission stop instruction COM24. The controller 29 generates the control signal CTL1 including the optical transmission stop instruction COM24, based on the received optical transmission stop instruction COM24, and the transmitter 28 transmits the control signal CTL1 including the optical transmission stop instruction COM24 to the transmission device 10. In the transmission device 10, the receiver 18 receives the control signal CTL1 including the optical transmission stop instruction COM24. Thereafter, the controller 19 instructs the transmitter 30, based on the optical transmission stop instruction COM24, to stop the optical transmission operation in the optical transmitter 14. More specifically, the controller 19 instructs the power source 35 with use of the control signal CLD12 to stop supply of power to the drive current controller 34. Consequently, the drive current is not fed to the optical transmitter 14, and the optical transmitter 14 thereby stops the optical transmission operation.

Moreover, since the optical fiber 901 is broken in such a manner, in the reception device 20, the error rate BER is increased. Accordingly, in the error rate monitor 60 of the receiver 40, the error rate comparator 63 determines that the error rate BER estimated by the error rate estimator 61 is higher than the upper limit value BERH of the error rate BER stored in the limit value storage section 52, and thereby generates the optical transmission stop instruction COM25. The controller 29 generates the control signal CTL1 including the optical transmission stop instruction COM25, based on the received optical transmission stop instruction COM25, and the transmitter 28 transmits the control signal CTL1 including the optical transmission stop instruction COM25 to the transmission device 10. In the transmission device 10, the receiver 18 receives the control signal CTL1 including the optical transmission stop instruction COM25. The controller 19 instructs the transmitter 30, based on the optical transmission stop instruction COM25, to stop the optical transmission operation in the optical transmitter 14. More specifically, the controller 19 instructs the drive current controller 34 with use of the control signal CLD11 to stop the optical transmission operation in the optical transmitter 14. Consequently, the optical transmitter 14 stops the optical transmission operation.

Further, in the case C2, since the reception device 20 has not received the data signal transmitted from the transmission device 10, the controller 29 does not generate the control signal CTL1 including notification that the reception device 20 has received the data signal transmitted from the transmission device 10. Accordingly, in the transmission device 10, the controller 19 instructs the drive current collector 34 with use of the control signal CLD11 to stop the optical transmission operation in the optical transmitter 14. Consequently, the optical transmitter 14 stops the optical transmission operation.

Furthermore, for example, the optical fiber 901 may not be completely broken and the reception device 20 may thereby receive part of the optical signal. In such a case, the input level Lin may be slightly low but higher than the lower limit value LinL of the input level Lin, and the error rate BER may be lower than the upper limit value BERH of the error rate BER. However, in such a case, the input level Lin may become too low in comparison with the output level Lout of the optical signal outputted from the optical transmitter 14 of the transmission device 10. In other words, part of the optical signal transmitted from the transmission device 10 is leaked from the optical fiber 901 to cause a decrease of the input level Lin. Accordingly, in a case where the input level Lin is too low in consideration of, for example but not limited to, the output level Lout indicated by the output level information INFL1, loss of optical transmission lines (such as the optical fiber 901 and the connectors 91, 92, 11, and 21), and minimum optical sensitivity of the optical receiver 22, the input level comparator 53 generates the optical transmission stop instruction COM24. The controller 19 of the transmission device 10 instructs the transmitter 30, based on the optical transmission stop instruction COM24, to stop the optical transmission operation in the optical transmitter 14. More specifically, the controller 19 instructs the power source 35 with use of the control signal CLD12 to stop supply of power to the drive current controller 34. Thus, the drive current is not fed to the optical transmitter 14, and the optical transmitter 14 thereby stops the optical transmission operation.

In addition, for example, in a case where a user notices that the optical fiber 901 is broken, in a similar manner to that in the case C1, for example, the user operates the operation section 17 of the transmission device 10, and the operation section 17 thereby generates the optical transmission stop instruction COM13. Moreover, for example, in a case where the user operates the operation section 27 of the reception device 20, the operation section 27 generates the optical transmission stop instruction COM23. Consequently, the optical transmitter 14 stops the optical transmission operation in a similar manner to that in the case C1.

(Case C3)

The case C3 is that the drive current controller 34 or the optical transmitter 14 of the transmission device 10 malfunctions due to an unintended reason to cause an excessively high output level Lout.

In the case C3, the drive current in the optical transmitter 14 is increased. Accordingly, in the drive current monitor 36 of the transmitter 30, the current value comparator 39 determines that the current value Idrv of the drive current detected by the drive current detector 37 is higher than the upper limit value IdrvH stored in the limit value storage section 38 to generate the optical transmission stop instruction COM11. The controller 19 instructs the transmitter 30, based on the optical transmission stop instruction COM11, to stop the optical transmission operation in the optical transmitter 14. More specifically, the controller 19 instructs the power source 35 with use of the control signal CLD12 to stop supply of power to the drive current controller 34. Accordingly, the drive current is not fed to the optical transmitter 14, and the optical transmitter 14 thereby stops the optical transmission operation.

Moreover, in the case C3, in the reception device 20, the input level Lin is increased. Accordingly, in the input level monitor 50 of the receiver 40, the input level comparator 53 determines that the input level Lin detected by the input level detector 51 is higher than the upper limit value LinH of the input level Lin stored in the limit value storage section 52, and generates the optical transmission stop instruction COM24. The controller 29 generates the control signal CTL1 including the optical transmission stop instruction COM24, based on the received optical transmission stop instruction COM24, and the transmitter 28 transmits the control signal CTL1 including the optical transmission stop instruction COM24 to the transmission device 10. In the transmission device 10, the receiver 18 receives the control signal CTL1 including the optical transmission stop instruction COM24. The controller 19 instructs the transmitter 30, based on the optical transmission stop instruction COM24, to stop the optical transmission operation in the optical transmitter 14. More specifically, the controller 19 instructs the power source 35 with use of the control signal CLD12 to stop supply of power to the drive current controller 34. Accordingly, the drive current is not fed to the optical transmitter 14, and the optical transmitter 14 thereby stops the optical transmission operation.

Further, for example, in a case where a user notices that the output level Lout is too high, in a similar manner to those in the cases C1 and C2, for example, the user operates the operation section 17 of the transmission device 10, and the operation section 17 thereby generates the optical transmission stop instruction COM13. Furthermore, for example, in a case where the user operates the operation section 27 of the reception device 20, the operation section 27 generates the optical transmission stop instruction COM23. Consequently, the optical transmitter 14 stops the optical transmission operation in a similar manner to those in the cases C1 and C2.

In the communication system 1, when unintended various situations such as, but not limited to, the cases C1 to C2 occur, the optical transmission operation in the optical transmitter 14 is stopped, which makes it possible to reduce the possibility that laser light is leaked from the optical cable. This makes it possible to enhance safety in the communication system 1.

Moreover, in the communication system 1, since the frame includes the output level information INFL1, as described in the case C2, for example, even in a case where the optical fiber 901 is not completely broken and the reception device 20 receives part of the optical signal, it is possible to generate the optical transmission stop instruction COM13. This makes it possible to enhance safety in the communication system 1.

Further, in the communication system 1, in each of the cases C1 to C3, it is possible to stop the optical transmission operation in the optical transmitter 14 by a plurality of methods; therefore, even if one of the methods does not work due to malfunction or any other reason, it is possible to stop the optical transmission operation by another method. This makes it possible to enhance safety in the communication system 1.

[Effects]

In the embodiment, when unintended various situations such as, but not limited to, the cases C1 to C3 occur, the optical transmission operation in the optical transmitter is stopped, which makes it possible to enhance safety.

In the embodiment, the frame includes the output level information. This makes it possible to enhance safety, for example, even in the case where the optical fiber is not completely broken.

Modification Example 1

In the foregoing embodiment, the data signal is transmitted through one optical fiber 901; however, the number of optical fibers is not limited to one, and the data signal may be transmitted through, for example, a plurality of optical fibers. Such a modification example is described in detail below.

FIG. 4 illustrates a configuration example of a communication system 1A according to the modification example. The communication system 1A may include a transmission cable 90A, a transmission device 10A, and a reception device 20A. The transmission cable 90A may include four optical fibers 901 to 904. The optical fibers 901 to 904 each are adapted to transmit a data signal from the transmission device 10A to the reception device 20A.

The transmission device 10A may include transmission lanes 101 to 104 and a controller 19A. The transmission lanes 101 to 104 respectively correspond to the optical fibers 901 to 904. Each of the transmission lanes 101 to 104 may include the processor 12, the transmitter 30, and the optical transmitter 14. The controller 19A is adapted to supply the control signals CLD11 and CLD12 and the output level information INFL1 to each of the transmission lanes 101 to 104, and to receive the optical transmission stop instruction COM11 from each of the transmission lanes 101 to 104. This allows the controller 19A to control the transmission lanes 101 to 104 separately.

The reception device 20A may include the reception lanes 201 to 204 and a controller 29A. The reception lanes 201 to 204 respectively correspond to the optical fibers 901 to 904. Each of the reception lanes 201 to 204 may include the optical receiver 22, the receiver 40, and the processor 24. The controller 29A is adapted to receive the optical transmission stop instructions COM24 and COM25 from each of the reception lanes 201 to 204. This allows the controller 29A to control the reception lanes 201 to 204 separately.

With this configuration, for example, in the case where the optical fiber 901 is broken (see the case C2), the controller 19A provides an instruction to stop the optical transmission operation in the optical transmitter 14 of the transmission lane 101 corresponding to the optical fiber 901. This makes it possible to enhance safety in the communication system 1A.

Modification Example 2

In the foregoing embodiment, the communication system 1 is configured with use of the transmission device 10 and the reception device 20. The configuration of the communication system is not limited thereto. Alternatively, the communication system may be configured with use of, for example, two communication devices that are able to transmit and receive a data signal. Such a modification example is described in detail below.

FIG. 5 illustrates a configuration example of a communication system 2 according to the modification example. The communication system 2 may include a transmission cable 90B and communication devices 70 and 80. The transmission cable 90B may include optical fibers 901 and 905. The optical fiber 901 is adapted to transmit a data signal from the communication device 70 to the communication device 80. The optical fiber 905 is adapted to transmit a data signal from the communication device 80 to the communication device 70.

The communication device 70 may include the connector 11, a processor 72, the transmitter 30, the optical transmitter 14, an optical receiver 77, a receiver 130, a processor 78, the coupling detector 15, the operation section 17, and a controller 79. The communication device 80 may include the optical receiver 22, the receiver 40, a processor 84, a processor 87, a transmitter 140, an optical transmitter 88, the coupling detector 25, the operation section 27, and a controller 89.

First, respective blocks are described focusing on data transmission from the communication device 70 to the communication device 80.

As with the processor 12 according to the foregoing embodiment, the processor 72 of the communication device 70 is adapted to perform predetermined processing to generate the data INF1 and the control data INFC1. At this occasion, the processor 72 generates the control data INFC1, based on the output level information INFL1, and the control signal CTL2 supplied from the controller 79. The control signal CTL2 includes the optical transmission stop instructions COM12 to COM15.

As with the controller 19 according to the foregoing embodiment, when the controller 79 receives, from the coupling signal receiver 15B, notification that the communication device 70 and the communication device 80 are coupled to each other, the controller 79 supplies control signals CLD11 and CLD12 to the transmitter 30 to control the optical transmitter 14 so as to feed a desired drive current through the optical transmitter 14. Thereafter, the controller 79 generates the output level information INFL1 indicating the output level Lout corresponding to the drive current, and supplies the output level information INFL1 to the processor 72. Moreover, when the controller 79 receives the optical transmission stop instructions COM11 to COM13 and COM22 to COM25, the controller 79 supplies the control signals CLD11 and CLD12 to the transmitter 30 to instruct the transmitter 30 to stop the optical transmission operation in the optical transmitter 14.

As with the processor 24 according to the foregoing embodiment, the processor 84 of the communication device 80 is adapted to perform predetermined processing, based on the data INF2 and the control data INFC2. At this occasion, the processor 84 supplies the output level information INFL1 included in the control data INFC2 to the receiver 40, and supplies the control signal CTL2 included in the control data INFC to the controller 89.

As with the controller 29 according to the foregoing embodiment, when the controller 89 receives, from the coupling signal receiver 25B, notification that the communication device 70 and the communication device 80 are coupled to each other, the controller 89 allows the receiver 40 to start reception of the data signal. Thereafter, the controller 89 generates the control signal CTL1 including notification that the receiver 40 has received the data signal transmitted from the communication device 70. Moreover, when the controller 89 receives the optical transmission stop instructions COM22 to COM25, the controller 89 generates the control signal CTL1 including the optical transmission stop instructions COM22 to COM25.

Next, respective blocks are described focused on data transmission from the communication device 80 to the communication device 70.

As with the processor 72 of the communication device 70, the processor 87 of the communication device 80 is adapted to perform predetermined processing to generate the data INF3 and the control data INFC3. At this occasion, the processor 87 generates the control data INFC3, based on the output level information INFL2, and the control signal CTL1 supplied from the controller 89.

As with the transmitter 30 of the communication device 70, the transmitter 140 is adapted to generate a data signal S140, based on the data INF3 and the control data INFC3. Moreover, the transmitter 140 controls the output level Lout of an optical signal outputted from the optical transmitter 88 with use of a signal S144, based on control signals CLD21 and CLD22. Further, the transmitter 140 also has a function of generating the optical transmission stop instruction COM21, based on the drive current in the optical transmitter 88.

As with the optical transmitter 14 of the communication device 70, the optical transmitter 88 is adapted to convert an electrical signal (the data signal S140) into an optical signal and output the optical signal, and to vary the output level Lout of the optical signal, based on the signal S144. The optical transmitter 88 also has a function of supplying, to the transmitter 140, a signal S88 for detection of the current value Idrv of the drive current.

As with the processor 79 of the communication device 70, when the controller 89 receives, from the coupling signal receiver 25B, notification that the communication device 70 and the communication device 80 are coupled to each other, the controller 89 supplies the control signal CLD21 and CLD22 to the transmitter 140 to control the optical transmitter 88 so as to feed a desired drive current through the optical transmitter 88. Thereafter, the controller 89 generates the output level information INFL2 indicating the output level Lout corresponding to the drive current, and supplies the output level information INFL1 to the processor 87. Moreover, when the controller 89 receives the optical transmission stop instructions COM21 to COM23 and COM12 to COM15, the controller 89 supplies the control signals CLD11 and CLD12 to the transmitter 140 to instruct the transmitter 140 to stop the optical transmission operation in the optical transmitter 88.

As with the optical receiver 22 of the communication device 80, the optical receiver 77 of the communication device 70 is adapted to convert the optical signal transmitted from the communication device 80 to an electrical signal to generate a data signal S77.

As with the receiver 40 of the communication device 80, the receiver 130 is adapted to generate the data INF4 and the control data INFC4, based on the data signal S77. The receiver 130 also has a function of generating the optical transmission stop instruction COM14, based on the input level Lin of the data signal S77 and generating the optical transmission stop instruction COM15, based on the error rate BER of the data signal S77.

As with the processor 84 of the communication device 80, the processor 78 is adapted to perform predetermined processing, based on the data INF4 and the control data INFC4. At this occasion, the processor 78 supplies the output level information INFL2 included in the control data INFC4 to the receiver 130, and supplies the control signal CTL1 included in the control data INFC4 to the controller 79.

As with the controller 89 of the communication device 80, when the controller 79 receives, from the coupling signal receiver 15B, notification that the communication device 70 and the communication device 80 are coupled to each other, the controller 70 allows the receiver 130 to start reception of the data signal. Thereafter, the controller 79 generates the control signal CTL2 including notification that the receiver 130 has received the data signal transmitted from the communication device 80. When the controller 79 receives the optical transmission stop instructions COM12 to COM15, the controller 79 also generates the control signal CTL2 including the optical transmission stop instructions COM12 to COM15.

Here, the controller 79 corresponds to a specific but non-limiting example of "controller" of a first communication device in an embodiment of the disclosure. The receiver 130 corresponds to a specific but non-limiting example of "receiver" of a first communication device in an embodiment of the disclosure. The controller 89 corresponds to a specific but non-limiting example of "controller" of a second communication device in an embodiment of the disclosure. The transmitter 140 corresponds to a specific but non-limiting example of "transmitter" of a second communication device in an embodiment of the disclosure.

FIG. 6A illustrates operation in a case where optical communication using the optical fiber 901 is monitored. In FIG. 6A, a key signal in this operation is indicated by a solid line, and other signals are indicated by a broken line. In this case, the communication device 70 transmits the data signal to the communication device 80 through the optical fiber 901. Thereafter, the controller 89 of the communication device 80 supplies the control signal CTL1 to the controller 79 of the communication device 70 through the optical fiber 905. Thus, the communication system 2 monitors optical communication in the optical fiber 901 in a similar manner to that in the communication system 1 according to the foregoing embodiment.

FIG. 6B illustrates operation in a case where optical communication using the optical fiber 905 is monitored. In FIG. 6B, a key signal in this operation is indicated by a solid line, and other signals are indicated by a broken line. In this case, the communication device 80 transmits the data signal to the communication device 70 through the optical fiber 905. Thereafter, the controller 79 of the communication device 70 supplies the control signal CTL2 to the controller 89 of the communication device 80 through the optical fiber 901. Thus, the communication system 2 monitors optical communication in the optical fiber 905 in a similar manner to that in the communication system 1 according to the foregoing embodiment.

Although the technology has been described above with reference to the example embodiment and the modification examples, the technology is not limited thereto, and may be modified in a variety of ways.

For example, in the modification example 1 of the foregoing embodiment, the communication system is configured with use of a plurality of optical fibers. In the modification example 2 of the foregoing embodiment, the communication system is configured with use of two communication devices that are able to transmit and receive a data signal. The configuration of the communication system is not limited thereto. For example, the communication system may have a combination of these configurations. In other words, for example, in FIG. 5, a plurality of optical fibers may be used to transmit data signals from the communication device 70 to the communication device 80, and a plurality of optical fibers may be used to transmit data signals from the communication device 80 to the communication device 70.

Note that the effects described in the present specification are illustrative and non-limiting. Effects achieved by the technology may be effects other than those described above.

It is to be noted that the contents of the technology may have the following configurations.

(1) A communication device, comprising: a transmitter configured to generate a data signal; and a controller configured to stop an operation of the transmitter in response to an optical transmission stop instruction.

(2) The communication device according to (1), wherein, in a case where the controller receives the optical transmission stop instruction, the controller stops the operation of the transmitter, and wherein the optical transmission stop instruction has a predetermined bit pattern.

(3) The communication device according to (1) or (2), further comprising: a receiver configured to receive the optical transmission stop instruction from an external device via an electrical wire, and output the optical transmission stop instruction to the controller.

(4) The communication device according to any one of (1) to (3), further comprising: a coupling detector configured to determine whether the communication device is optically coupled to an external device, wherein, in a case where the coupling detector determines the communication device is not optically coupled to the external device, the coupling detector is configured to output the optical transmission stop instruction to the controller.

(5) The communication device according to any one of (1) to (5), wherein the transmitter further comprises a drive current monitor configured to detect a drive current of an optical transmitter coupled to the transmitter, wherein, in a case where the drive current monitor detects that the drive current exceeds a threshold current, the transmitter is configured to output the optical transmission stop instruction to the controller.

(6) The communication device according to any one of (1) to (6), wherein the optical transmission stop instruction has a predetermined bit pattern including a head, a packet body, and a tail.

(7) The communication device according to (6), wherein the packet body includes a plurality of bytes, the plurality of bytes being identical to one another.

(8) The communication device according to any one of (1) to (7), further comprising an optical transmitter configured to receive the data signal and generate an optical signal based on the data signal.

(9) The communication device according to (8), wherein the optical transmitter includes a laser diode.

(10) A communication device, comprising: a receiver configured to receive a data signal; a controller configured to generate an optical transmission stop instruction; and a transmitter configured to receive the optical transmission stop instruction from the controller and transmit the optical transmission stop instruction to an external device via an electrical wire.

(11) The communication device according to (10), further comprising: a coupling detector configured to determine whether the communication device is optically coupled to the external device, wherein, in a case where the coupling detector determines the communication device is not optically coupled to the external device, the coupling detector is configured to cause the controller to generate the optical transmission stop instruction.

(12) The communication device according to (10) or (11), wherein the receiver further comprises an input level monitor configured to measure an input level of the data signal, and wherein, in a case where the input level is below a threshold level, the receiver is configured to cause the controller to generate the optical transmission stop instruction.

(13) The communication device according to any one of (10) to (12), wherein the receiver further comprises an error rate monitor configured to measure an error rate of the data signal, and wherein, in a case where the error rate is greater than a threshold rate, the receiver is configured to cause the controller to generate the optical transmission stop instruction.

(14) The communication device according to any one of (10) to (13), wherein the optical transmission stop instruction has a predetermined bit pattern including a head, a packet body, and a tail.

(15) The communication device according to (14), wherein the packet body includes a plurality of bytes, the plurality of bytes being identical to one another.

(16) The communication device according to any one of (10) to (15), further comprising an optical receiver configured to receive an optical signal and generate the data signal based on the optical signal.

(17) A communication system, comprising: a first communication device, including: a first transmitter configured to generate a first data signal, and a first controller configured to stop an operation of the first transmitter in response to an optical transmission stop instruction; a second communication device, including: a first receiver configured to receive a second data signal; and a transmission cable including an electrical wire and at least one optical fiber.

(18) The communication system according to (17), wherein the second communication device further includes a second controller configured to generate the optical transmission stop instruction, and a second transmitter configured to receive the optical transmission stop instruction from the controller and transmit the optical transmission stop instruction to the first communication device via the electrical wire, and the first communication device further includes a second receiver configured to receive the optical transmission stop instruction from the second communication device via the electrical wire, and output the optical transmission stop instruction to the first controller.

(19) The communication system according to (17) or (18), wherein the first communication device comprises a coupling detector configured to determine whether the first communication device is optically coupled to the second communication device, and in a case where the coupling detector determines the transmission device is not optically coupled to the external device, the coupling detector is configured to output the optical transmission stop instruction to the controller.

(20) The communication system according to any one of (17) to (19), wherein the optical transmission stop instruction has a predetermined bit pattern including a head, a packet body, and a tail.

(21) The communication system according to (20), wherein the packet body includes a plurality of bytes, the plurality of bytes being identical to one another.

(22) The communication system according to any one of (17) to (21), wherein: the first communication device further includes an optical transmitter configured to receive the first data signal and generate an optical signal based on the data signal; and the second communication device further includes an optical receiver configured to receive the optical signal and generate the second data signal based on the optical signal.

(23) The communication system according to (22), wherein the optical transmitter includes a laser diode.

(24) A communication method, comprising: generating, at a first communication device, a first data signal; generating, at a second communication device optically coupled to the first communication device, a second data signal based on the first data signal; and in response to an optical transmission stop instruction, stopping the generating of the first data signal.

(25) The communication method according to (23), further comprising: generating, at the first communication device, an optical signal based on the first data signal; receiving, at the second communication device, the optical signal; and generating, at the second communication device, the second data signal based on the optical signal.

(26) A communication device including:
a transmitter configured to supply a first data signal to an optical transmitter, the optical transmitter being configured to transmit an optical signal;
a coupling detector configured to detect coupling to a communication partner with use of a first electrical signal; and
a controller configured to stop optical transmission operation in the optical transmitter, based on a detection result obtained by the coupling detector.

(27) The communication device according to (26), wherein
the transmitter includes a detector, the detector being configured to detect a current value of a drive current in the optical transmitter, and
the controller stops the optical transmission operation in the optical transmitter, further based on a detection result obtained by the detector.

(28) The communication device according to (26) or (27), wherein the first data signal includes level information indicating an output level of the first data signal in the optical transmitter.

(29) The communication device according to any one of (26) to (28), further including an operation section configured to accept operation by a user, wherein
the controller stops the optical transmission operation in the optical transmitter, further based on the operation by the user accepted by the operation section.

(30) The communication device according to any one of (26) to (29) further including a receiver configured to receive a first optical transmission stop instruction, wherein
the controller stops the optical transmission operation in the optical transmitter, further based on the first optical transmission stop instruction.

(31) The communication device according to (30), wherein the receiver receives a second electrical signal including the first optical transmission stop instruction.

(32) The communication device according to (30), wherein the receiver receives a second data signal from an optical receiver, the second data signal including the first optical transmission stop instruction, and the optical receiver being configured to receive an optical signal.

(33) The communication device according to (32), wherein
the controller further generates a second optical transmission stop instruction, based on the detection result obtained by the coupling detector, the second optical transmission stop instruction being configured to stop optical transmission operation in an optical transmitter of the communication partner, and
the first data signal includes the second optical transmission stop instruction.

(34) A communication device including:
a receiver configured to receive a first data signal from an optical receiver, the optical receiver being configured to receive an optical signal;
a coupling detector configured to detect coupling to a communication partner with use of a first electrical signal;
a controller configured to generate an optical transmission stop instruction, based on a detection result obtained by the coupling detector, the optical transmission stop instruction being configured to stop optical transmission operation in an optical transmitter of the communication partner; and
a transmitter configured to transmit the optical transmission stop instruction.

(35) The communication device according to (34), wherein
the receiver includes a first detector, the first detector being configured to detect an input level of the first data signal, and
the controller generates the optical transmission stop instruction, further based on a detection result obtained by the first detector.

(36) The communication device according to (35), wherein
the first data signal includes level information indicating an output level of the first data signal in the optical transmitter of the communication partner, and the controller generates the optical transmission stop instruction, further based on the level information.

(37) The communication device according to any one of (34) to (36), wherein the receiver includes a second detector, the second detector being configured to detect an error rate of the first data signal, and the controller generates the optical transmission stop instruction, further based on a detection result obtained by the second detector.

(38) The communication device according to any one of (34) to (37), further including an operation section configured to accept operation by a user, wherein the controller generates the optical transmission stop instruction, further based on the operation by the user accepted by the operation section.

(39) The communication device according to any one of (34) to (38), wherein the transmitter transmits a second electrical signal including the optical transmission stop instruction.

(40) The communication device according to any one of (34) to (38), wherein the transmitter supplies a second data signal to an optical transmitter, the optical transmitter being configured to transmit an optical signal.

(41) A communication system including:
a first communication device; and
a second communication device,
the first communication device including
a first transmitter configured to supply a data signal to an optical transmitter, the optical transmitter being configured to transmit an optical signal to the second communication device,
a first coupling detector configured to detect coupling to the second communication device with use of a first electrical signal, and
a first controller configured to stop optical transmission operation in the optical transmitter, based on a detection result obtained by the first coupling detector.

(42) The communication system according to (41),
wherein the second communication device includes
a first receiver configured to receive the data signal from an optical receiver, the optical receiver being configured to receive the optical signal transmitted from the first communication device,
a second coupling detector configured to detect coupling to the first communication device with use of the first electrical signal,
a second controller configured to generate an optical transmission stop instruction, based on a detection result obtained by the second coupling detector, the optical transmission stop instruction being configured to stop the optical transmission operation in the optical transmitter of the first communication device, and
a second transmitter configured to transmit the optical transmission stop instruction to the first communication device, and
wherein the first communication device further includes a second receiver configured to receive the optical transmission stop instruction from the second communication device, and
the first controller stops the optical transmission operation in the optical transmitter, further based on the optical transmission stop instruction.

It should be understood by those skilled in the art that various modifications, combinations, sub-combinations and alterations may occur depending on design requirements and other factors insofar as they are within the scope of the appended claims or the equivalents thereof.

1, 1A, 2 communication system
10, 10A transmission device
11 connector
12 processor
14 optical transmitter
15 coupling detector
15A coupling signal transmitter
15B coupling signal receiver
17 operation section
18 receiver
19, 19A controller
20, 20A reception device
21 connector
22 optical receiver
24 processor
25 coupling detector
25A coupling signal transmitter
25B coupling signal receiver
27 operation section
28 transmitter
29, 29A controller
30, 140 transmitter
31, 32 error correction encoder
33 frame generator
34 drive current controller
35 power source
36 drive current monitor
37 drive current detector
38 limit value storage section
39 current value comparator
40, 130 receiver
41 frame separator
42, 43 error correction decoder
50 input level monitor
51 input level detector
52 limit value storage section
53 input level comparator
60 error rate monitor
61 error rate estimator
62 limit value storage section
63 error rate comparator
72 processor
77 optical receiver
78 processor
79 controller
84 processor
87 processor
88 optical transmitter
89 controller
90, 90A, 90B transmission cable
101 to 104 transmission lane
201 to 204 reception lane
901 to 905 optical fiber
911 to 913 electric wire
70, 80 communication device
CLD11, CLD12, CLD21, CLD22 control signal
COM11 to COM15, COM21 to COM25 optical transmission stop instruction
CTL1, CTL2 control signal
INF1 to INF4 data
INFC1 to INFC4 control data
INFL1, INFL2 output level information
S14, S34, S88, S144 signal
S22, S30, S77, S140 data signal

The invention claimed is:

1. A communication device, comprising:
   a transmitter configured to generate a data signal, the transmitter including a drive current monitor configured to detect a drive current of an optical transmitter coupled to the transmitter;
   a controller configured to stop an operation of the transmitter in response to an optical transmission stop instruction; and
   a receiver configured to receive the optical transmission stop instruction from an external device via an electrical wire, and output the optical transmission stop instruction to the controller,
   wherein the optical transmission stop instruction has a predetermined bit pattern and includes a packet body, and
   wherein, in a case where the drive current monitor detects that the drive current exceeds a threshold current, the transmitter is configured to output the optical transmission stop instruction to the controller.

2. The communication device according to claim 1, wherein, in a case where the controller receives the optical transmission stop instruction, the controller stops the operation of the transmitter.

3. The communication device according to claim 1, further comprising:
   a coupling detector configured to determine whether the communication device is optically coupled to the external device,
   wherein, in a case where the coupling detector determines the communication device is not optically coupled to the external device, the coupling detector is configured to output the optical transmission stop instruction to the controller.

4. The communication device according to claim 1, wherein the predetermined bit pattern includes a head, the packet body, and a tail.

5. The communication device according to claim 1, wherein the packet body includes a plurality of bytes, the plurality of bytes being identical to one another.

6. The communication device according to claim 1, wherein the optical transmitter is configured to receive the data signal and generate an optical signal based on the data signal.

7. The communication device according to claim 6, wherein the optical transmitter includes a laser diode.

8. A communication device, comprising:
   a receiver configured to receive a data signal, the receiver including an input level monitor configured to measure an input level of the data signal;
   a controller configured to generate an optical transmission stop instruction; and
   a transmitter configured to receive the optical transmission stop instruction from the controller and transmit the optical transmission stop instruction to an external device via an electrical wire,
   wherein the optical transmission stop instruction has a predetermined bit pattern and includes a packet body, and
   wherein, in a case where the input level is below a threshold level, the receiver is configured to cause the controller to generate the optical transmission stop instruction.

9. The communication device according to claim 8, further comprising:
   a coupling detector configured to determine whether the communication device is optically coupled to the external device,
   wherein, in a case where the coupling detector determines the communication device is not optically coupled to the external device, the coupling detector is configured to cause the controller to generate the optical transmission stop instruction.

10. The communication device according to claim 8, wherein the receiver further comprises an error rate monitor configured to measure an error rate of the data signal, and
    wherein, in a case where the error rate is greater than a threshold rate, the receiver is configured to cause the controller to generate the optical transmission stop instruction.

11. The communication device according to claim 8, wherein the predetermined bit pattern includes a head, the packet body, and a tail.

12. The communication device according to claim 8, wherein the packet body includes a plurality of bytes, the plurality of bytes being identical to one another.

13. The communication device according to claim 8, further comprising an optical receiver configured to receive an optical signal and generate the data signal based on the optical signal.

14. A communication system, comprising:
    a first communication device, including:
      a first transmitter configured to generate a first data signal, the first transmitter including a drive current monitor configured to detect a drive current of an optical transmitter coupled to the transmitter,
      a first controller configured to stop an operation of the first transmitter in response to an optical transmission stop instruction, and
      a first receiver configured to receive the optical transmission stop instruction via an electrical wire, and output the optical transmission stop instruction to the first controller;
    a second communication device, including:
      a second receiver configured to receive a second data signal; and
    a transmission cable including the electrical wire and at least one optical fiber,
    wherein the optical transmission stop instruction has a predetermined bit pattern and includes a packet body,
    wherein the first receiver is configured to receive the optical transmission stop instruction from the second communication device, and
    wherein, in a case where the drive current monitor detects that the drive current exceeds a threshold current, the first transmitter is configured to output the optical transmission stop instruction to the first controller.

15. The communication system according to claim 14, wherein
    the second communication device further includes a second controller configured to generate the optical transmission stop instruction, and a second transmitter configured to receive the optical transmission stop instruction from the second controller and transmit the optical transmission stop instruction to the first communication device via the electrical wire.

16. The communication system according to claim 14, wherein
    the first communication device comprises a coupling detector configured to determine whether the first communication device is optically coupled to the second communication device, and in a case where the coupling detector determines the transmission device is not optically coupled to the external device, the coupling detector is configured to output the optical transmission stop instruction to the first controller.

17. The communication system according to claim 14, wherein the predetermined bit pattern includes a head, the packet body, and a tail.

18. The communication system according to claim 14, wherein the packet body includes a plurality of bytes, the plurality of bytes being identical to one another.

19. The communication system according to claim 14, wherein:
the first communication device further includes an optical transmitter configured to receive the first data signal and generate an optical signal based on the data signal; and
the second communication device further includes an optical receiver configured to receive the optical signal and generate the second data signal based on the optical signal.

20. The communication system according to claim 19, wherein the optical transmitter includes a laser diode.

21. A communication method, comprising:
generating, at a first communication device, a first data signal;
detecting, at the first communication device, a drive current of an optical transmitter of the first communication device;
generating, at a second communication device optically coupled to the first communication device, a second data signal based on the first data signal;
receiving, at the first communication device, an optical transmission stop instruction from the second communication device via an electrical wire;
in a case where the detected drive current exceeds a threshold current, outputting the optical transmission stop instruction to a controller of the first communication device; and
in response to the optical transmission stop instruction, stopping the generating of the first data signal,
wherein the optical transmission stop instruction has a predetermined bit pattern and includes a packet body.

22. The communication method according to claim 20, further comprising:
generating, at the first communication device, an optical signal based on the first data signal;
receiving, at the second communication device, the optical signal; and
generating, at the second communication device, the second data signal based on the optical signal.

* * * * *